(12) United States Patent
Mere

(10) Patent No.: US 11,016,507 B2
(45) Date of Patent: May 25, 2021

(54) FLIGHT MANAGEMENT ASSEMBLY FOR AN AIRCRAFT

(71) Applicant: Airbus Operations (S.A.S.), Toulouse (FR)

(72) Inventor: Jean-Claude Mere, Verfeil (FR)

(73) Assignee: Airbus Operations (S.A.S.), Toulouse (FR)

( * ) Notice: Subject to any disclaimer, the term of this patent is extended or adjusted under 35 U.S.C. 154(b) by 259 days.

(21) Appl. No.: 16/163,205

(22) Filed: Oct. 17, 2018

(65) Prior Publication Data

US 2019/0162554 A1 May 30, 2019

(30) Foreign Application Priority Data

Oct. 19, 2017 (FR) ...................................... 1759876

(51) Int. Cl.
| | |
|---|---|
| *G05D 1/10* | (2006.01) |
| *G01C 23/00* | (2006.01) |
| *G08G 5/00* | (2006.01) |
| *G05D 1/02* | (2020.01) |
| *G05D 1/00* | (2006.01) |

(52) U.S. Cl.
CPC ........... *G05D 1/101* (2013.01); *G01C 23/005* (2013.01); *G05D 1/0088* (2013.01); *G05D 1/0202* (2013.01); *G08G 5/0039* (2013.01); *G08G 5/0052* (2013.01)

(58) Field of Classification Search
CPC ...................................................... G05D 1/101
See application file for complete search history.

(56) References Cited

U.S. PATENT DOCUMENTS

| | | | |
|---|---|---|---|
| 8,090,531 B2* | 1/2012 | Goutelard | G01C 23/005 701/466 |
| 8,209,115 B2* | 6/2012 | Lucas | G08G 5/025 701/122 |

(Continued)

FOREIGN PATENT DOCUMENTS

| | | |
|---|---|---|
| FR | 2930987 A1 | 11/2009 |
| FR | 3010542 A1 | 3/2015 |
| FR | 3044758 A1 | 6/2017 |

OTHER PUBLICATIONS

French Search Report for French Application No. 1759876 dated Jun. 12, 2018.

*Primary Examiner* — Michael A Berns
(74) *Attorney, Agent, or Firm* — Jenkins, Wilson, Taylor & Hunt, P.A.

(57) ABSTRACT

A flight management assembly for an aircraft includes at least one flight management system and at least one display device, the flight management system configured to manage at least one flight plan of the aircraft and one long-term reference path of the aircraft. The flight management assembly additionally includes an auxiliary computer, the auxiliary computer being separate from and independent of the flight management system, the auxiliary computer linked to the flight management system and to the display device, the auxiliary computer configured to perform prediction computations to generate at least one short-term path, from at least the long-term reference path received from the flight management system and from current flight parameters of the aircraft and from piloting setpoints of the aircraft.

6 Claims, 1 Drawing Sheet

(56) References Cited

U.S. PATENT DOCUMENTS

| | | |
|---|---|---|
| 8,447,520 B2 | 5/2013 | Gine I Cortiella et al. |
| 9,087,450 B2 * | 7/2015 | Hedrick ............... G08G 5/0047 |
| 9,368,035 B2 | 6/2016 | Mere et al. |
| 9,666,082 B2 * | 5/2017 | Roger .................. G08G 5/0021 |
| 9,709,992 B2 * | 7/2017 | Hedrick .................. G01S 1/047 |
| 9,983,584 B2 * | 5/2018 | Bruggemann ......... G01C 5/005 |
| 10,475,347 B2 * | 11/2019 | Mere .................... G08G 5/0034 |

* cited by examiner

FLIGHT MANAGEMENT ASSEMBLY FOR AN AIRCRAFT

CROSS-REFERENCE TO RELATED APPLICATION

This application claims the benefit of and priority to French patent application number 17 59876 filed on Oct. 19, 2017, the entire disclosure of which is incorporated by reference herein.

TECHNICAL FIELD

The present disclosure relates to a flight management assembly for an aircraft.

BACKGROUND

Current avionic flight management architectures for an aircraft are generally based on two flight management systems of FMS (for 'Flight Management System') type for managing the flight plan, computing the path to be followed and transmitting, to the automatic pilot system of the aircraft, depending on the position of the aircraft, guidance setpoints enabling it to control the rudders so as to follow this path.

Conventionally, the flight management system first of all performs a first computation. This first computation computes, for a descent and/or approach phase, the arrival path (starting from the destination airport to the current position) using a well-defined blueprint, by taking identical scenarios into account each time. Between two first computations of this type, only the flight plan (defined by the route followed, the departure and arrival procedures, the possible altitude and/or speed restrictions over certain points of the flight plan, the cruising altitude) and a few parameters (a cost index, the wind, the temperature, etc.) are modified. Thus, for a given flight plan, the first computation of the path provides substantially the same result, regardless of the current state of the aircraft (position, speed, actual wind, etc.). Then, second of all, the flight management system performs a second computation in order to update the first computation, starting from the current position of the aircraft and taking into account the differences between the current state of the aircraft and the scenarios considered in the first computation.

Implementing these two computations in the flight management system exhibits drawbacks in terms of improving the availability and the integrity of the computation, in particular for operations such as required navigation performance operations of RNP-AR (for 'Required Navigation Performance—Authorization Required') type or operations with reduced crew, in so far as the loss of or the error in the path have higher criticality levels than those permitted by a conventional architecture with only two flight management systems.

The conventional architecture is therefore not entirely satisfactory.

SUMMARY

An aim of the present disclosure is to rectify this drawback. To this end, it relates to a flight management assembly for an aircraft, the flight management assembly comprising at least one flight management system and at least one display device, the flight management system being configured to manage at least one flight plan of the aircraft and one long-term reference path of the aircraft.

According to the disclosure herein, the flight management assembly additionally comprises at least one auxiliary computer, the auxiliary computer being separate from and independent of the flight management system, the auxiliary computer being linked to the flight management system and to the display device, the auxiliary computer being configured to perform prediction computations so as to generate at least one short-term path, from at least the long-term reference path, received from the flight management system, and from current flight parameters of the aircraft and from piloting setpoints of the aircraft.

Thus, by virtue of the disclosure herein, there is a dual-level architecture for computing the path, namely a first level with the flight management system that manages at least the mission (the flight plan) and the associated reference path over the long term for flight parameters independently of the current state of the aircraft, and a second level with the auxiliary computer, more critical than the first level, that manages the short-term path prediction in front of the aircraft, in particular depending on its current state.

Thus, by virtue of this architecture, it is possible to perform more critical operations (of RNP-AR type or with reduced crew), and to do so in particular with an excess cost lower for example than that of adding a third flight management system into the aircraft. Specifically, separating the two computations in effect makes it possible, in order to satisfy safety requirements, to increase the number of specimens only on the part that requires this (the auxiliary computer that computes the short-term path), and not on the rest of the flight management assembly. Preferably, the flight management assembly includes two flight management systems, in particular similar ones, each of which is configured to manage at least the flight plan of the aircraft and the long-term reference path of the aircraft.

Advantageously, the display device is configured to display, on at least one display screen, the long-term reference path received from the flight management system and the short-term path received from the auxiliary computer.

Furthermore, advantageously, the management assembly includes at least one memory that is preferably integrated into the display device or into the auxiliary computer, the memory being configured to record at least the long-term reference path received from the flight management system, the reference path thus recorded being displayed by the display device on the display screen as a long-term reference path in the event of failure of the flight management system.

Moreover, advantageously, the auxiliary computer is also configured to compute guidance orders intended to guide the aircraft on the short-term path. Furthermore, advantageously, the flight management assembly includes a guidance computer that receives the guidance orders computed by the auxiliary computer and that is configured to guide the aircraft in accordance with the guidance orders.

Moreover, advantageously, the auxiliary computer is configured to compute the short-term path from one of the following piloting setpoints:
- a piloting setpoint representative of manual piloting of the aircraft by a pilot;
- a piloting setpoint coming from an automatic piloting system of the aircraft, operating in a selected mode;
- a piloting setpoint coming from an automatic piloting system of the aircraft, operating in a managed mode.

The present disclosure also relates to an aircraft, in particular a transport plane, which is provided with at least one flight management assembly such as the one described above.

BRIEF DESCRIPTION OF THE DRAWINGS

The appended figures will make it easy to understand how the disclosure herein may be embodied. In these example figures, identical references denote similar elements. More particularly.

DETAILED DESCRIPTION

Figure 1:
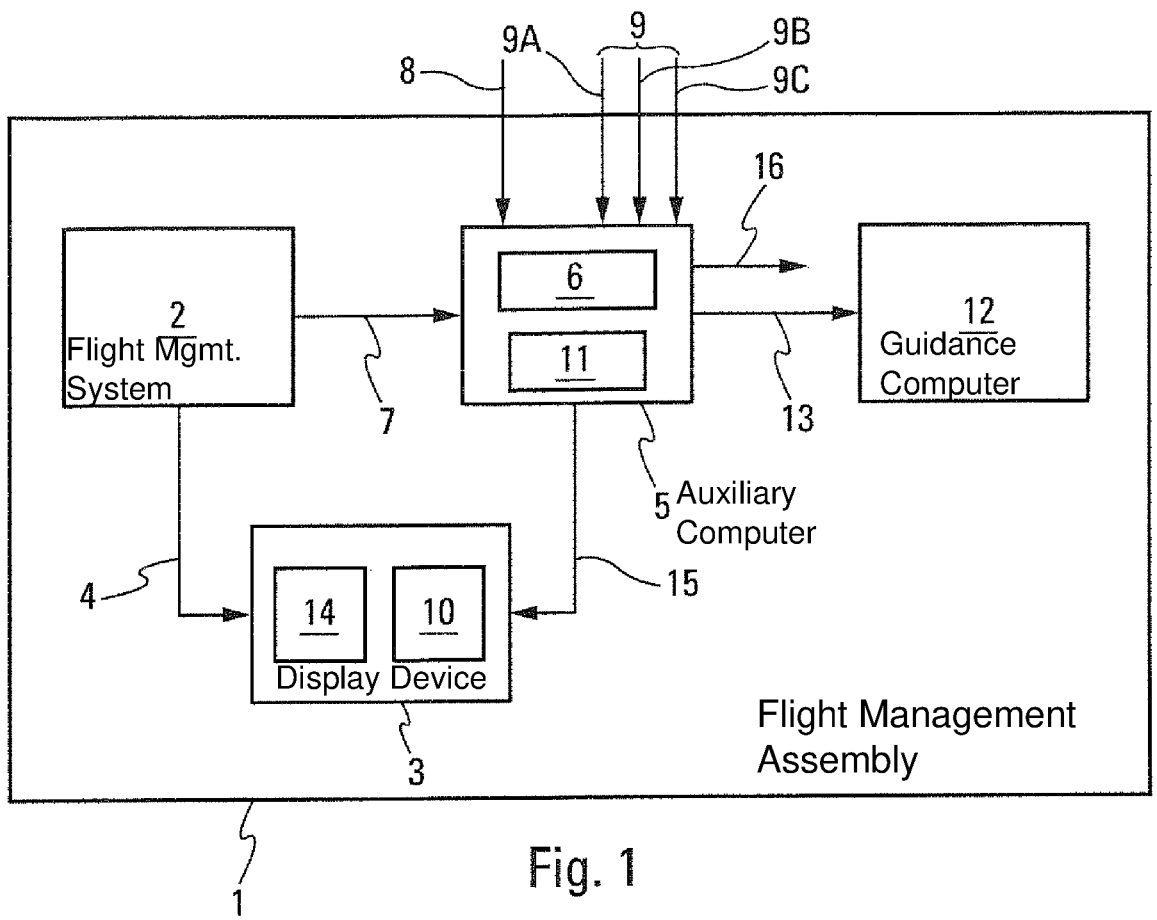
FIG. 1 schematically shows one particular embodiment of a flight management assembly.

The flight management assembly 1 shown schematically in one particular embodiment in FIG. 1 and that makes it possible to illustrate the disclosure herein is intended to manage the flight of an aircraft (not shown), in particular of a transport plane, on which it is installed.

This flight management assembly 1 includes, as shown in FIG. 1:
- at least one flight management system 2 of FMS type. This flight management system 2 is configured to manage at least one flight plan of the aircraft and a long-term reference (flight) path TR (FIG. 2) of the aircraft; and
- at least one display device 3 linked by way of a link 4 to the flight management system 2.

According to the disclosure herein, the flight management assembly 1 additionally includes an auxiliary computer 5.

The auxiliary computer 5 is separate from and independent of the flight management system 2. In addition, the auxiliary computer 5 is linked to the flight management system 2 and to the display device 3 by way of links 7 and 15, respectively.

Figure 2:
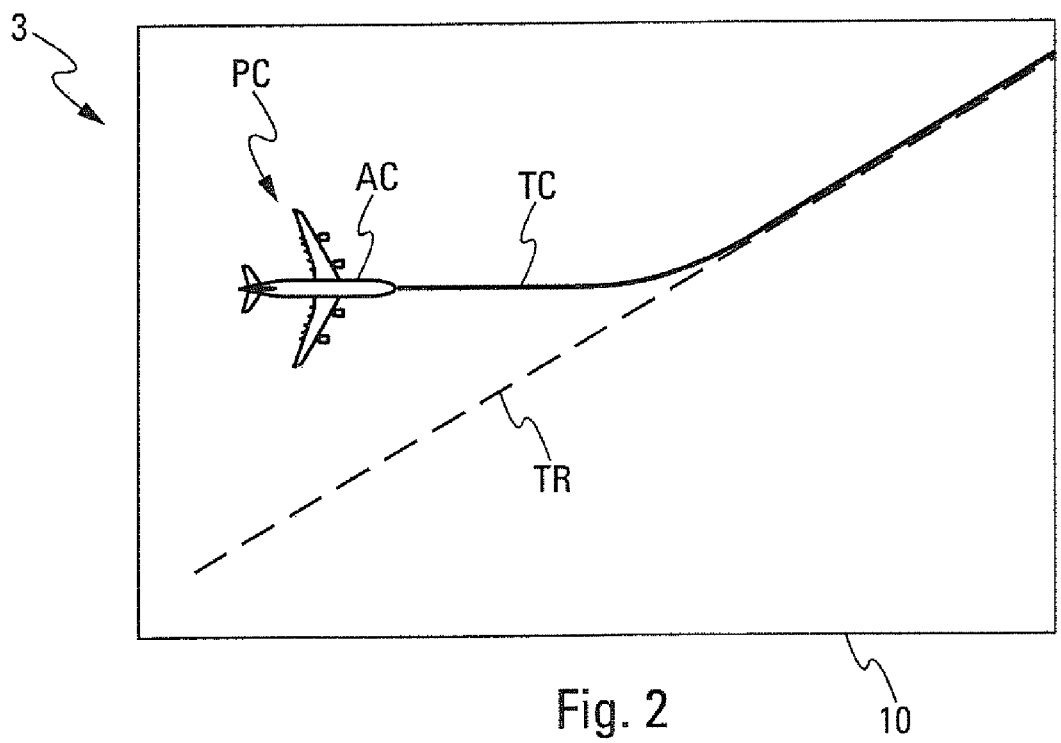
FIG. 2 schematically illustrates a display implemented by a display device of the flight management assembly.

The auxiliary computer 5 includes a computing unit 6 configured to perform prediction computations in order to generate at least one short-term (flight) path TC (FIG. 2). The computing unit 6 generates the short-term path from at least the long-term reference (flight) path, received from the flight management system 2 by way of the link 7, and from current flight parameters of the aircraft and from piloting setpoints of the aircraft received by way of links 8 and 9, respectively, from conventional systems (not shown) of the aircraft.

As a result, with this flight management assembly 1 architecture, the flight management system 2 performs, as is conventional, a computation of the long-term reference path, namely by computing the arrival path (that is to say starting from a destination point, generally the destination airport).

To compute the short-term path, the auxiliary computer 5 performs a computation intended to update the computation performed by the flight management system 2, starting from the aircraft, and taking into account the differences between the current state at the current position of the aircraft and the scenarios taken into account by the flight management system 2.

The short-term path is computed so as to allow the aircraft, if it follows the path, to join back up to the reference path if the aircraft is not situated thereon. This computation is not difficult to implement, in contrast to the one that relates to the entire flight plan. It may thus be transferred into the more critical auxiliary computer 5 without any great risk.

Thus, when the current state of the aircraft deviates from the scenarios used to compute the reference path, the forward prediction makes it possible to update the computation in front of the aircraft, so as to present a path that is coherent with the flight of the aircraft. For example, if the aircraft nears a transition between two segments at a speed different from that initially forecast, the computation of the transition is updated with the current speed and an anticipated turn where applicable, so as to prevent the aircraft from moving out of the reference path.

Thus, by virtue of the disclosure herein, there is a dual-level architecture for computing the path, namely a first level (of strategic type) with the flight management system 2 that manages the mission (the flight plan) and the associated reference path over the long term, independently of the current state of the aircraft, and a second level (of tactical type) with the auxiliary computer 5, more critical than the first, that manages the short-term path prediction in front of the aircraft depending on its current state and possibly the measured atmosphere (wind, etc.).

Thus, by virtue of this architecture, it is possible to perform more critical operations (of RNP-AR type or with reduced crew), and to do so in particular with an excess cost lower for example than that of adding a third flight management system into the aircraft. Specifically, separating the two computations in effect makes it possible, in order to satisfy safety requirements, to increase the number of specimens only on the part that requires this (the auxiliary computer that computes the short-term path), and not on the rest of the flight management assembly.

A change in the current guidance architecture is thus provided, together with the introduction of functional changes, that is not based only on the flight management system, such that the overall availability and integrity of the managed guidance function are improved.

The display device 3 is configured to display, on at least one display screen 10, the long-term reference path TR received from the flight management system 2 by way of the link 4 and the short-term path TC received from the auxiliary computer 5 by way of the link 15.

In the simplified depiction of FIG. 2, a symbol AC illustrating the current position PC of the aircraft has also been shown. The path TC allows the aircraft to join back up to the path TR from its current position PC.

The computing unit 6 of the auxiliary computer 5 is configured to compute the short-term path from piloting setpoints depending on the current piloting mode of the aircraft, that is to say on the piloting mode being used at the current time, namely manual piloting, or automatic piloting in selected mode (for which the pilot enters setpoints that an automatic piloting system (not shown) of the aircraft follows) or else automatic piloting in managed mode (for which the automatic piloting system follows piloting setpoints that it has at least partly determined beforehand).

More precisely, the auxiliary computer 5 is configured to compute the short-term path from any one of the following piloting setpoints, which is active at the current time:
- a piloting setpoint representative of manual piloting of the aircraft performed by a pilot, the piloting setpoint being received by way of a link 9A from at least one measurement element associated with a control unit (not shown) actuated by the pilot;
- a piloting setpoint received by way of a link 9B of a selected mode of the automatic piloting system (not shown) of the aircraft;

a piloting setpoint received by way of a link 9C of a managed mode of the automatic piloting system (not shown) of the aircraft.

The links 9A, 9B and 9C form part of the link 9.

Moreover, the auxiliary computer 5 also includes a computing unit 11 configured to compute guidance orders intended to guide the aircraft on the short-term path, computed beforehand by the computing unit 6 of the auxiliary computer 5.

Furthermore, the flight management assembly 1 also includes a guidance computer 12 of conventional type. This guidance computer 12 receives the guidance orders from the auxiliary computer 11 by way of a link 13, and it is configured to apply, as is conventional, the guidance orders to piloting elements of the aircraft, such as rudder actuators.

Furthermore, the display device 3 includes at least one memory 14. This memory 14 may be integrated into the display device 3, such as in the example of FIG. 1, or else into the auxiliary computer 5 or into another system of the aircraft. The memory 14 is configured to record at least the long-term reference path, received from the flight management system 2 for example by way of the link 4.

The reference path thus recorded is displayed by the display device 3 on the display screen 10 in the event of failure of the flight management system 2, and more precisely when no reference path is transmitted to the display device 3, or when only an erroneous (or invalid) reference path is transmitted to the display device 3.

Thus, in the event of total loss of the flight management system, only the dynamic computation of the long-term reference path is lost, which does not have an impact on the guidance (since the position of the aircraft is controlled using the short-term path), whereas with the conventional current architecture, even when storing the last computed valid path, it would not be possible to guide the aircraft appropriately in all cases, in so far as this path is not updated again depending on the current state of the aircraft.

Among the functional changes under consideration in future cockpits, it is contemplated to present the crew with new path predictions so as to improve the crew's perception as to what the aircraft is doing and will do in the short term. These path predictions, which are all of the same kind, namely short term, starting from the aircraft (in contrast to the rearward prediction performed by the flight management system) need to be refreshed at a high rate, in contrast to the long-term prediction that is recomputed at a much lower frequency. The auxiliary computer 5 is able to make such predictions.

The short-term path computed by the auxiliary computer 5 may also be transmitted, via a link 16, to other devices or user means of the aircraft that could use this path, for example for computations, checks or a display.

Moreover, in one preferred embodiment, the flight management assembly 1 includes two flight management systems, each of which is similar to the flight management system 2 of FIG. 1 and performs the processing operations implemented by the latter.

In comparison with a conventional architecture, with the flight management assembly 1, the two flight management systems 2 that have the same functional scope are retained, with the exception of the computation of short-term path predictions and the computation of guidance setpoints for controlling the position of the aircraft using the path, these latter computations being transferred to the auxiliary computer 5. Thus, the flight plan and the reference path that the flight management systems 2 manage serve only as references, but do not contribute to the guidance of the aircraft.

The reference path is computed regularly or upon a particular event (revision of the flight plan, update of the wind parameters, etc.) on the basis of predefined scenarios (not necessarily the same over the entire duration of the flight), but without taking into account the current state of the aircraft.

The auxiliary computer 5, for its part, manages all of the short-term predictions, and more precisely:
- those based on the commands of the crew in manual mode, with or without joining back up to the flight plan;
- those based on the selections or setpoints entered by the crew in selected mode, with or without joining back up to the flight plan; and
- those based on the current state of the aircraft in managed mode.

These dynamic path predictions (illustrated by the path TC) are displayed on the same display screen 10 as the reference path TR and the guidance setpoints are computed by the auxiliary computer 5 on the basis of these path predictions, thereby making it possible to continue guiding the aircraft on the flight plan in the event of total loss of the flight management system 2. As these predictions are limited in terms of time (the distance in front of the aircraft) and restricted to only short-term restrictions in front of the aircraft (mode, altitude and/or speed restriction over the waypoint), the algorithms implemented in the auxiliary computer 5 are of a less complex nature than those of the flight management system(s) 2, thereby making it possible to provide architectures having several specimens of this auxiliary computer 5, so that the availability and the integrity of the overall path computation chain (and therefore guidance over a path) are improved.

With this architecture of the flight management assembly 1, all of the short-term path prediction computations are grouped together in the same auxiliary computer 5, which is separate from the flight management system 2 (or which represents a function hosted on an item of hardware different from that of the flight management system 2), and which is developed with a higher criticality level than the flight management system, so as to ensure better availability and integrity of the guidance.

A change in the current guidance architecture is thus provided, together with the introduction of functional changes, that is not based only on the flight management system, such that the overall availability and integrity of the managed guidance function are improved.

Grouping together the computation of the short-term path predictions in the same auxiliary computer, which is different from the flight management system, makes it possible, in addition to avoiding loading the flight management system with highly dynamic and therefore burdensome new computations, to contemplate isolating the computation of these short-term paths on the basis of which the guidance setpoints are established in an auxiliary computer, which is less complex and therefore easier and more advantageous to develop on an industrial basis than the flight management system.

The overall availability and integrity of the guidance is thus improved, provided that the availability of the auxiliary computer is ensured, this being achieved by installing an adequate number of specimens with respect to the security objectives targeted for the function, which remains advantageous in comparison with a solution in which the number of specimens of the flight management system would be increased, firstly because the auxiliary computer introduces a dissimilarity with respect to the flight management system, and secondly because it is less complex and its cost is therefore lower.

An example is shown hereinafter of the operation of a flight management assembly 1, with reference to FIG. 1.

The flight plan is loaded into the flight management system 2, as is conventional, either by manual entry (or inputting) performed by a pilot of the aircraft or by way of a data transmission link.

The flight management system 2 computes the complete (long-term) reference path associated with this flight plan, and does so periodically or in the case of a particular event, and it sends the reference path:

to the display device 3 in order to display it on the display screen 10 (and store it in the memory 14); and to the auxiliary path prediction computer 5 so that the latter is able to compute the (short-term) path that makes it possible to join back up to this reference path.

On the basis of the selected guidance mode, of the guidance setpoints entered by the pilot and/or of the current state of the aircraft with respect to the reference path, along with possible path capture setpoints entered by the pilot, the auxiliary computer 5 makes a prediction of the short-term path, which it transmits to the display device 3 in order to display it.

In addition, depending on the current state of the aircraft, the auxiliary computer 5 also establishes guidance setpoints for controlling the position of the aircraft using this short-term path prediction, and it transmits the guidance setpoints to the guidance computer 12, which takes over the guidance in accordance with these guidance setpoints.

In the event of failure of the flight management system 2, the reference path is no longer updated (and is no longer able to be modified), but the last valid reference path (stored in the memory 14) continues to be displayed by the display device 3. The auxiliary computer 5, for its part, continues to compute a short-term path prediction to this last stored reference path, thereby making it possible to maintain the guidance on an ongoing basis.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A flight management assembly for an aircraft, the flight management assembly comprising:

at least one flight management system and at least one display, the flight management system configured to generate, from a flight plan of the aircraft, a long-term reference path of the aircraft associated with the flight plan and independently of a current state of the aircraft; and at least one auxiliary computer separate from and independent of the flight management system, the auxiliary computer being connected to the flight management system and to the display, the auxiliary computer being configured to perform prediction computations to generate at least one short-term path, the at least one short-term path configured to guide the aircraft to the long-term reference path, if the aircraft is not situated on the long-term reference path, from at least the long-term reference path received from the flight management system, and from current states of the aircraft and from piloting setpoints of the aircraft;

wherein the auxiliary computer is configured to compute guidance orders configured to guide the aircraft on the short-term path and transmit the guidance order to a guidance computer of the flight management assembly;

wherein the guidance computer is configured to receive the guidance orders computed by the auxiliary computer and to guide the aircraft in accordance with the guidance orders.

2. The flight management assembly according to claim 1, wherein the display is configured to display, on at least one display screen, the long-term reference path received from the flight management system and the short-term path received from the auxiliary computer.

3. The flight management assembly according to claim 2, comprising at least one memory configured to record at least the long-term reference path received from the flight management system, the long-term reference path thus recorded being displayed by the display on the display screen as the long-term reference path in an event of failure of the flight management system.

4. The flight management assembly according to claim 1, wherein the auxiliary computer is configured to compute the short-term path from any one of piloting setpoints as follows:

a first piloting setpoint representative of manual piloting of the aircraft by a pilot;

a second piloting setpoint coming from an automatic piloting system of the aircraft, operating in a selected mode;

a third piloting setpoint coming from the automatic piloting system of the aircraft, operating in a managed mode.

5. The flight management assembly according to claim 1, comprising two flight management systems, each of which is configured to manage at least the flight plan of the aircraft and the long-term reference path of the aircraft.

6. An aircraft comprising at least one flight management assembly, the flight management assembly comprising:

at least one flight management system and at least one display, the flight management system configured to generate, from a flight plan of the aircraft, a long-term reference path of the aircraft associated with the flight plan and independently of a current state of the aircraft; and at least one auxiliary computer separate from and independent of the flight management system, the auxiliary computer being connected to the flight management system and to the display, the auxiliary computer being configured to perform prediction computations to generate at least one short-term path, the at least one short-term path configured to guide the aircraft to the long-term reference path, if the aircraft is not situated on the long-term reference path, from at least the long-term reference path received from the flight management system, and from current states of the aircraft and from piloting setpoints of the aircraft;

wherein the auxiliary computer is configured to compute guidance orders configured to guide the aircraft on the short-term path and transmit the guidance order to a guidance computer of the flight management assembly;

wherein the guidance computer is configured to receive the guidance orders computed by the auxiliary computer and to guide the aircraft in accordance with the guidance orders.

* * * * *